US008630535B2

(12) United States Patent
Yoshida

(10) Patent No.: US 8,630,535 B2
(45) Date of Patent: Jan. 14, 2014

(54) LIGHT EMISSION CONTROL DEVICE AND LIGHT EMISSION CONTROL METHOD

(75) Inventor: Daisuke Yoshida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 72 days.

(21) Appl. No.: 13/468,741

(22) Filed: May 10, 2012

(65) Prior Publication Data

US 2012/0288263 A1   Nov. 15, 2012

(30) Foreign Application Priority Data

May 13, 2011   (JP) .................................. 2011-108566

(51) Int. Cl.
  *G03B 15/02* (2006.01)
(52) U.S. Cl.
  USPC .............. 396/61; 396/157; 396/159; 396/165
(58) Field of Classification Search
  USPC .............................. 396/61, 106, 157, 159, 165
  See application file for complete search history.

(56) References Cited

U.S. PATENT DOCUMENTS 6,654,062 B1 * 11/2003 Numata et al. ................. 348/362
6,859,618 B1 *  2/2005 Yip .................................. 396/61
7,894,715 B2 *  2/2011 Osawa ............................. 396/61
2007/0212054 A1 *  9/2007 Kobayashi .................... 396/165
2011/0097067 A1 *  4/2011 Osawa ........................... 396/165

FOREIGN PATENT DOCUMENTS

JP           6-250254 A       9/1994

* cited by examiner

*Primary Examiner* — Clayton E LaBalle
*Assistant Examiner* — Warren K Fenwick
(74) *Attorney, Agent, or Firm* — Canon U.S.A., Inc. IP Division

(57) ABSTRACT

A control device is provided for controlling a light emission device. The control device includes a light metering unit configured to acquire respective light metering values from a plurality of light metering regions. The control device further includes a correction unit configured to correct information about a light metering value of a target region based on a result of comparison between the light metering value of the target region and the light metering value of the light metering region at the periphery of the target region among the plurality of light metering regions, the result being acquired by the light metering unit allowing the light emission device to perform pre-flashing. Also, a calculation unit is provided which is configured to calculate a main light emission amount of the light emission device based on the information about the light metering value corrected by the correction unit.

15 Claims, 7 Drawing Sheets

| $AE_1$ | $AE_2$ | $AE_3$ |
|---|---|---|
| $AE_4$ | $AE_5$ | $AE_6$ |
| $AE_7$ | $AE_8$ | $AE_9$ |

| $F_{AE1}$ | $F_{AE2}$ | $F_{AE3}$ |
|---|---|---|
| $F_{AE4}$ | $F_{AE5}$ | $F_{AE6}$ |
| $F_{AE7}$ | $F_{AE8}$ | $F_{AE9}$ |

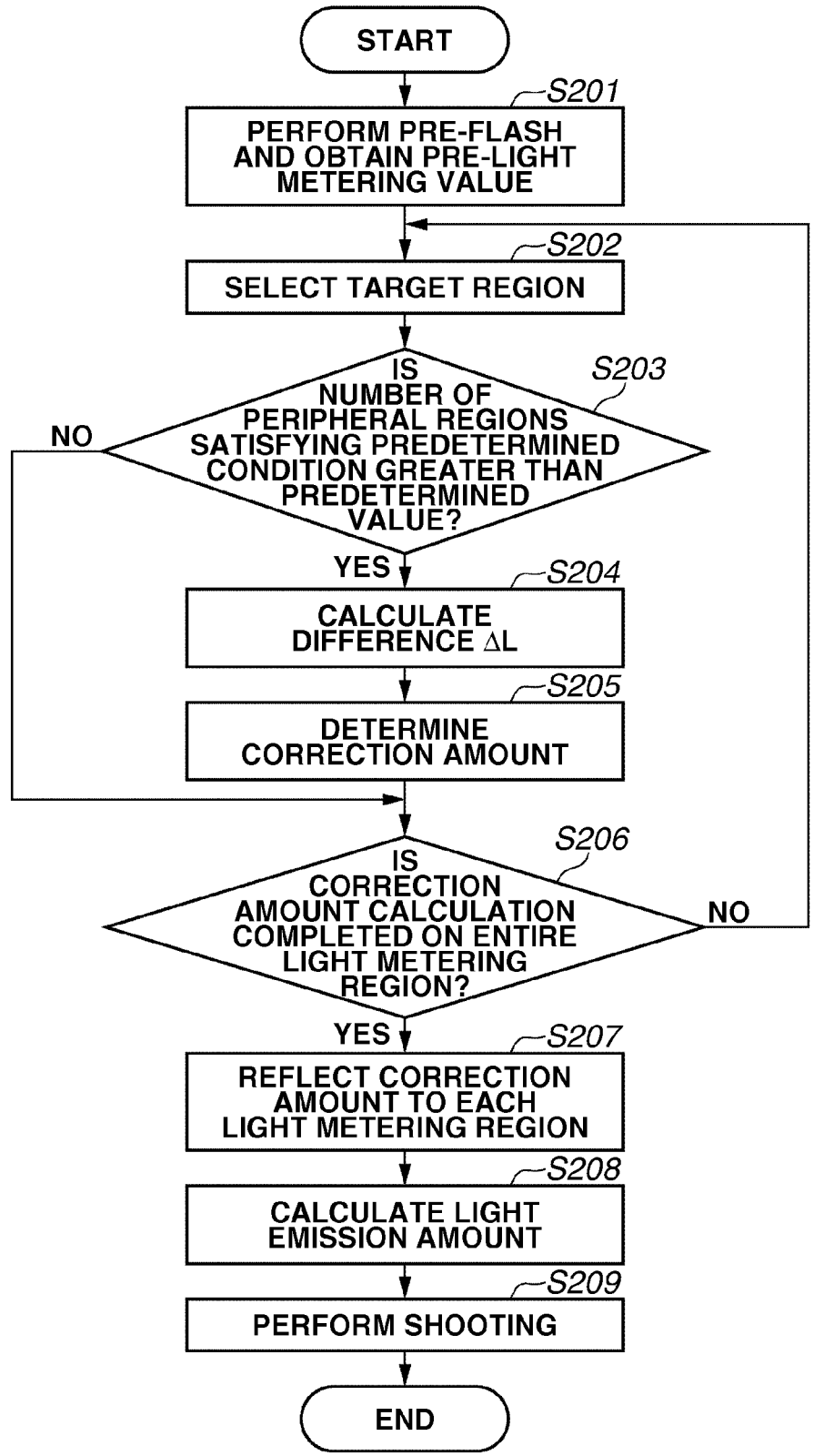

FIG.7A
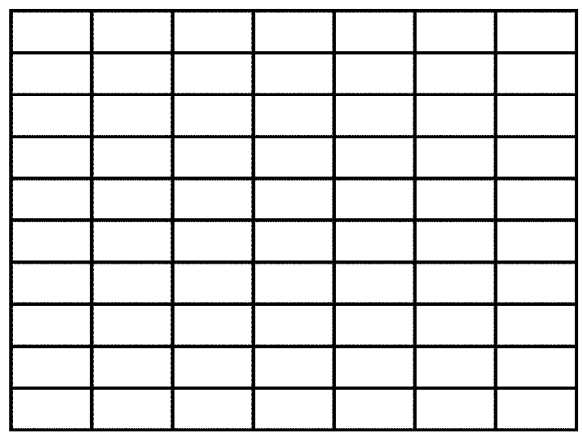
FIG.7B
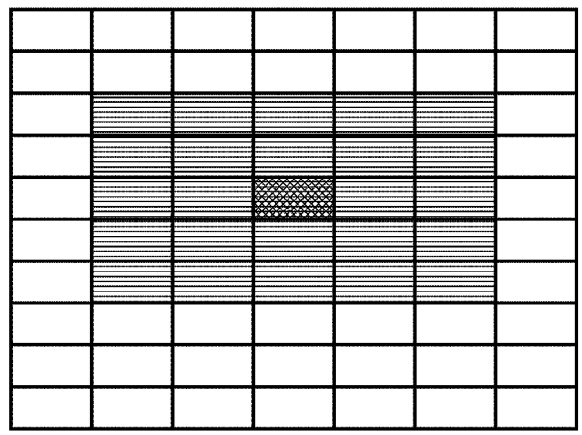

LIGHT EMISSION CONTROL DEVICE AND LIGHT EMISSION CONTROL METHOD

BACKGROUND OF THE INVENTION

1. Field of the Invention

The present invention relates to a light emission control device and a light emission control method for controlling a light emission device.

2. Description of the Related Art

Conventionally, an imaging device, which can capture an image with allowing a light emission device such as a flash device to emit light, performs a preliminary light emission (hereinafter referred to as a pre-flash), performs light metering of reflected light of the preliminary light emission through a multi-segment light metering sensor (hereinafter referred to as a pre-light metering), and calculates a light emission amount at the time of a main light emission, based on the measurement result.

For example, Japanese Patent Application Laid-Open No. 6-250254 discusses a flash control device that performs light amount control based on a light metering value of flash preliminary light emission in a light metering area corresponding to a focusing region determined by a multipoint focus detection.

However, in the flash control device discussed in Japanese Patent Application Laid-Open No. 6-250254, as a ratio of a subject region occupying the light metering area corresponding to the focusing region is smaller, it may be difficult to accurately calculate a light emission amount at the time of a main light emission. Specifically, a ratio of a subject occupying one light metering area may be small, so that an region where a pre-flash is not reflected, even if the pre-flash is performed, may be included, or a region where a pre-light emission is reflected at higher reflectance than a subject may be included. In this case, when an where no pre-flash is reflected is included, a light metering value in a pre-flash of a corresponding light metering area becomes smaller than an originally assumed value and when the region where the pre-flash is reflected at higher reflectance than the subject is included, the light metering value becomes greater than the originally assumed value. Hence, the light emission amount at the time of the main light emission becomes greater or smaller than an appropriate light emission amount with respect to the subject.

SUMMARY OF THE INVENTION

According to an aspect of the present invention, a light emission control device for controlling a light emission device includes a light metering unit configured to acquire respective light metering values from a plurality of light metering regions; a correction unit configured to correct information about a light metering value of a target region based on a result of comparison between the light metering value of the target region and the light metering value of the light metering region at the periphery of the target region among the plurality of light metering regions, the result being acquired by the light metering unit allowing the light emission device to perform pre-flashing, and a calculation unit configured to calculate a main light emission amount of the light emission device based on the information about the light metering value corrected by the correction unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 5 is a flowchart illustrating a process of calculating a light emission amount in flash photography according to a second exemplary embodiment of the present invention.

FIGS. 7A and 7B are drawings illustrating a modified example of a method of setting a peripheral region according to an exemplary embodiment of the present invention.

DESCRIPTION OF THE EMBODIMENTS

Various exemplary embodiments, features, and aspects of the invention will be described in detail below with reference to the drawings.

Figure 1:
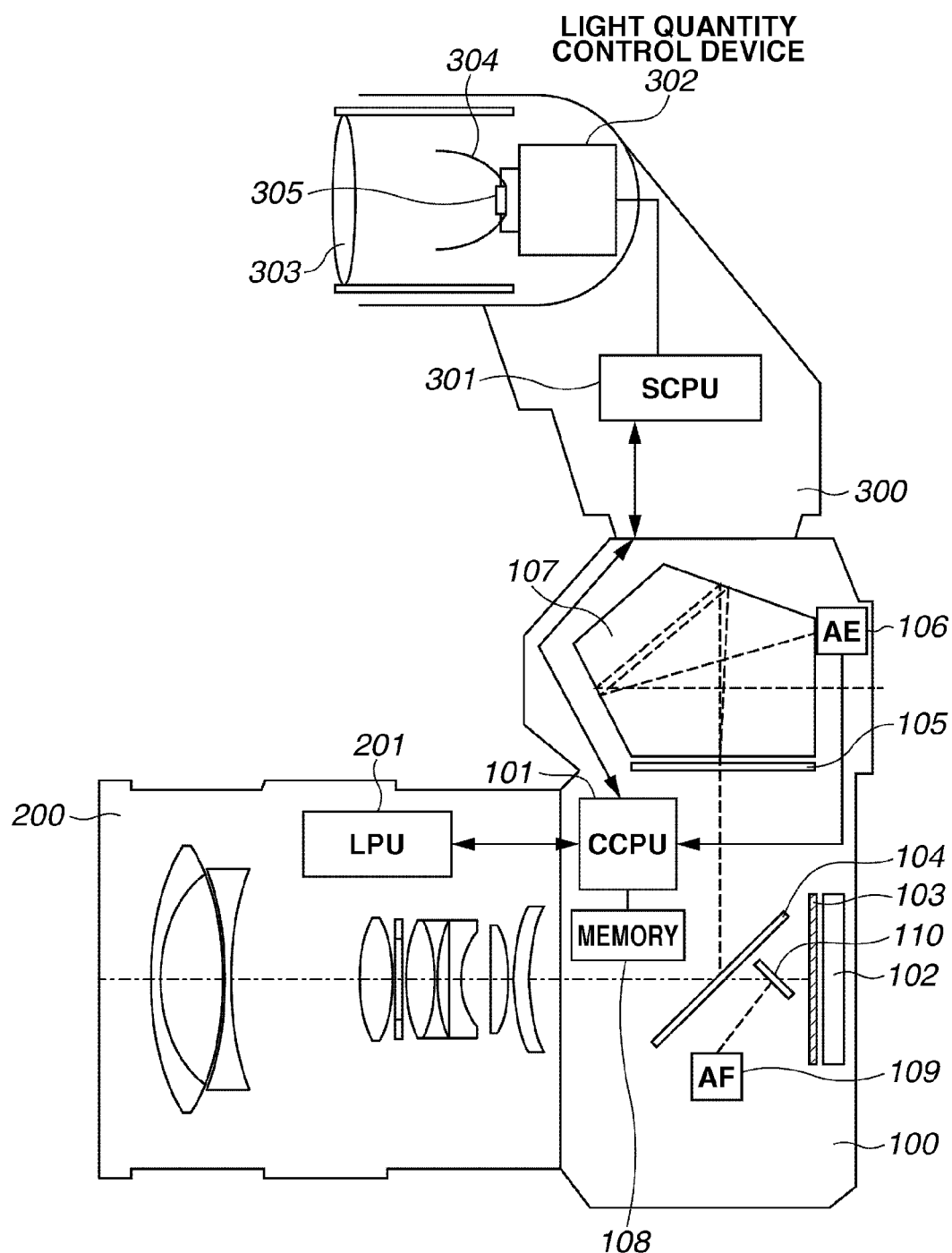
FIG. 1 is a configuration diagram of a camera system according to an exemplary embodiment of the present invention.

A first exemplary embodiment will be described. FIG. 1 is a configuration diagram of a camera system according to the first exemplary embodiment. The camera system includes a camera body 100, which is a light emission control device controlling a light emission device, a lens unit 200, and a flash device 300, which is a light emission device.

First, the configuration of the camera body 100 will be described. A microcomputer CCPU (hereinafter, referred to as a camera microcomputer) 101 controls each component of the camera body 100. A charge-coupled device (CCD) or complementary metal-oxide semiconductor (CMOS) image sensor 102 includes an infrared cut filter, a low-pass filter, or the like. A subject image is formed on the CCD or CMOS image sensor 102 through a shooting lens of the lens unit 200.

A shutter 103 shields the image sensor 102 from light when not capturing an image, and moves to guide light incident through the shooting lens toward the image sensor 102 when capturing the image. A half mirror 104 reflects a portion of light incident through the lens unit 200 and forms the image on a focus plate 105 when not capturing an image.

Figures 2A, 2B, 2C:
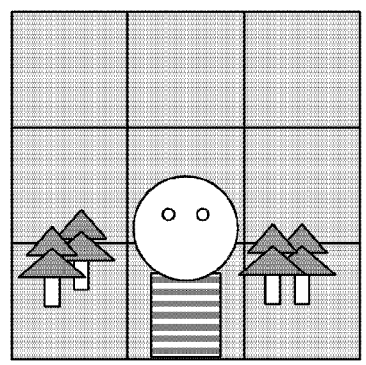
FIGS. 2A, 2B and 2C are drawings illustrating a relation between a light metering area of a light metering sensor and a light metering value according to an exemplary embodiment of the present invention.

A light metering sensor (AE sensor) 106 is a multi-segment light metering sensor that includes a plurality of light metering regions. In an exemplary embodiment, as illustrated in FIGS. 2A to 2C, the light metering sensor 106 performs light metering on a photographing screen divided into nine light metering regions AE1 to AE9. In addition, the light metering sensor 106 outputs a light metering value of each light metering regions to the camera microcomputer 101 as a measurement result.

A pentagonal prism 107 guides the subject image of the focus plate 105 to the light metering sensor 106 and an optical viewfinder (not illustrated).

A memory 108 stores a table for determining a correction amount to be used in a correction process, which will be described below, or temporarily stores a correction amount.

A focus detection circuit 109 includes a focus detection sensor with a plurality of focus detection regions.

In addition, the camera body 100 includes an operation unit (not illustrated) including a power switch and a shutter button. If a user presses the shutter button halfway, SW1 is turned on and a shooting preparation operation is initiated. If a user presses the shutter button fully, SW2 is turned on and a shooting operation is initiated.

Moreover, by manipulating the operation unit, on which region of the photographing screen is to be in-focus (on which region is to be focused) can be set. A user can allow a selected region to be in-focus by manipulating the operation unit. Also, in the case that a user does not set an arbitrary region by manipulating the operation unit, the camera microcomputer 101 sets a focusing region automatically by a predetermined algorithm.

Next, the configuration of the flash device 300 will be described. A microcomputer SCPU (hereinafter referred to as a strobe microcomputer) 301 controls the operation of each component of the flash device 300.

A light quantity control device 302 includes a boosting circuit that boosts a battery voltage to allow a light source 305, which will be described below, to emit light, and a current control circuit that controls the start and stop of the light emission. A zoom optical system 303, which changes an irradiation angle of the flash device 300, includes a panel such as a Fresnel lens. A reflector 304 is provided to condense the light emission flux of the light source 305 using a xenon tube, a white LED, or the like, and irradiate the condensed light emission flux to the subject.

The lens unit 200 further includes a microcomputer LPU (hereinafter, referred to as a lens microcomputer) 201. The lens microcomputer 201 performs a focus adjustment or the like by driving the shooting lens, based on information transmitted from the camera microcomputer 101. Moreover, the lens unit 200 outputs information about a focal length of the shooting lens to the camera microcomputer 101.

Figure 3:
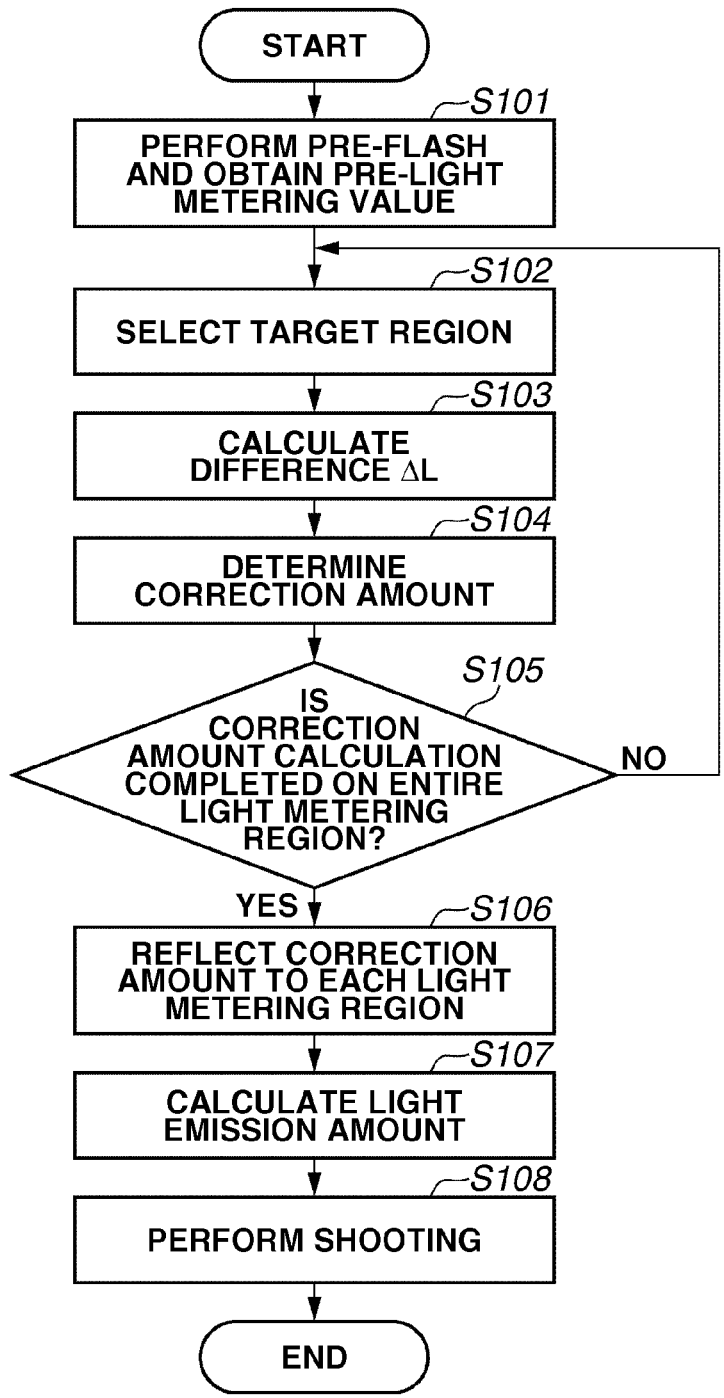
FIG. 3 is a flowchart illustrating a process of calculating a light emission amount in flash photography according to a first exemplary embodiment of the present invention.

FIG. 3 is a flowchart illustrating a process of calculating a light emission amount when capturing a flash photography. The flowchart illustrated in FIG. 3 is started when SW2 is turned on by pressing the shutter button fully in a state that is set to perform flash photography. In addition, the state that is set to perform the flash photography is a state in which a user operates the operation unit to select a mode of allowing the flash device 300 to emit light when capturing an image. Or, the state is a state in which the camera microcomputer 101 determines that it is needed to allow the flash device 300 to emit light, based on the result of light metering performed before the shutter button is pressed fully. In the exemplary embodiment, the case of shooting a scene illustrated in FIG. 2C will be described.

In step S101, when the camera microcomputer 101 determines that SW2 is turned on, in step S101, the camera microcomputer 101 allows a flash device 300 to perform pre-flash with a predetermined light quantity, for example, 1/16 times the light emission amount of a full flash. The camera microcomputer 101 measures reflected light through a light metering sensor 106 in a pre-flash, and acquires a light metering value in the pre-flash (hereinafter referred to as a pre-light metering value). Pre-light metering values of the respective light metering regions, which are acquired at this time, are represented by FAEi (i=1, 2, . . . , 9) as illustrated in FIG. 2B.

In step S102, the camera microcomputer 101 selects one light metering region among a plurality of light metering regions as a target region. Then, peripheral light metering regions at the periphery of the selected target region in vertical, horizontal and diagonal directions are defined as peripheral regions. For example, if a central light metering region corresponding to a face region of a subject illustrated in FIG. 2C is selected as a target region, eight adjacent light metering regions are peripheral regions. Moreover, the selection of the target region is performed in order of AEi (i=1, 2, . . . , 9), and the following processes are performed on the entire light metering regions.

In step S103, the camera microcomputer 101 calculates a difference in pre-light metering values between the target region and each light metering region as the peripheral region. In the exemplary embodiment, it is assumed that a difference $\Delta L$ is obtained by subtracting the light metering value of the peripheral region from the light metering value of the target region and following description will be provided.

In step S104, the camera microcomputer 101 determines a correction amount of the light metering value of the target region, based on the difference $\Delta L$ in pre-light metering values between the target region and each light metering region as the peripheral region calculated in step S103. A method of determining a correction amount will be described with reference to FIGS. 4A to 4D.

Figure 4A:
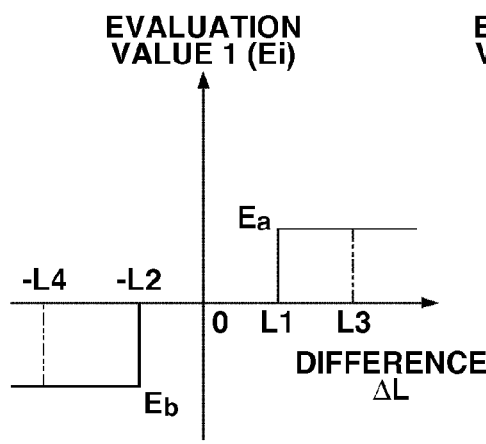
FIGS. 4A, 4B, 4C and 4D are drawings illustrating a method of determining a correction amount according to an exemplary embodiment of the present invention.

First, an evaluation value 1 (Ei) is calculated, based on the difference $\Delta L$ calculated in step S103. As illustrated in FIG. 4A, when the difference $\Delta L$ is equal to or greater than L1 (L1>0), it is considered that a subject distance is farther in the peripheral region than in the target region, or a reflectance of a subject is lower in the peripheral region than in the target region. Hence, it is considered that since a subject region similar to the peripheral region is also included in the target region, the light metering value becomes smaller than the originally assumed light metering value. Therefore, when the difference $\Delta L$ is equal to or greater than L1, the evaluation value 1 is set to Ea (Ea>0), and the number of the regions N(Ea), in which the evaluation value 1 is Ea, is increased by +1 (initial value of N(Ea) is 0).

On the contrary, when the difference $\Delta L$ is less than $-L2$ (L2>0), it is considered that a subject distance is closer in the peripheral region than in the target region, or a reflectance of a subject is higher in the peripheral region than in the target region. Hence, it is considered that since a subject region similar to the peripheral region is also included in the target region, the light metering value becomes greater than the originally assumed light metering value. Therefore, when the difference $\Delta L$ is less than $-L2$, the evaluation value 1 is set to Eb (Eb<0), and the number N(Eb) of the regions, in which the evaluation value 1 is Eb, is increased by +1 (initial value of N(Eb) is 0). The similar calculation of the evaluation value 1 (Ei) is performed on each light metering region as the peripheral region.

Figure 4B:
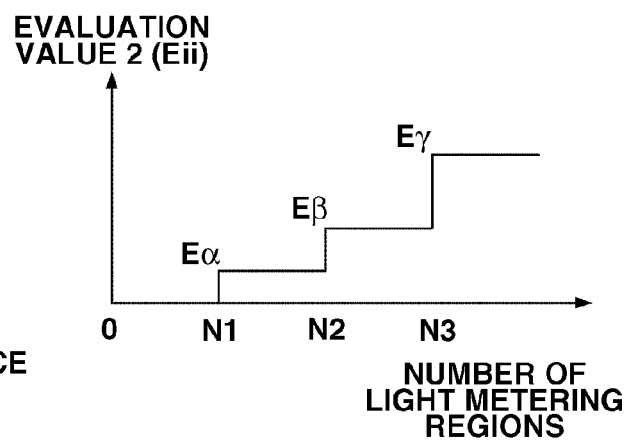

Then, an evaluation value 2 (Eii) is calculated. The calculation of the evaluation value 2 (Eii) is performed on Ea and Eb obtained by the calculation of the evaluation value 1. As illustrated in FIG. 4B, as the number of the regions N(Ea), in which the evaluation value 1 (Ei) is Ea, is increased, the evaluation value 2 (Eii) is increased. Specifically, if N1≤N(Ea)<N2, the evaluation value 2 (Eii) is set to E$\alpha$. If N2≤N(Ea)<N3, the evaluation value 2 (Eii) is set to E$\beta$. If N3≤N(Ea), the evaluation value 2 (Eii) is set to E$\gamma$ (E$\alpha$<E$\beta$<E$\gamma$). The same comparison as above is performed on the number N(Eb) of the regions, in which the evaluation value 1 (Ei) is Eb, and the evaluation value 2 (Eii) is calculated.

Then, an evaluation value 3 (Eiii) is calculated, based on the evaluation value 1 (Ei) and the evaluation value 2 (Eii). The evaluation value 3 is calculated by the following equation (1).

$$\text{Evaluation value 3 } (Eiii) = (Ea \times Eii) + (Eb \times Eii) \quad (1)$$

According to equation (1), the evaluation value 3 (Eiii) is increased as the number of the regions, in which the difference ΔL is equal to or greater than L1, is increased. The evaluation value 3 (Eiii) is decreased as the number of the regions, in which the difference ΔL is less than −L2, is increased Then, a correction amount (Rev) for the light metering value of the target region is calculated, based on the evaluation value 3 (Eiii).

Figure 4C:
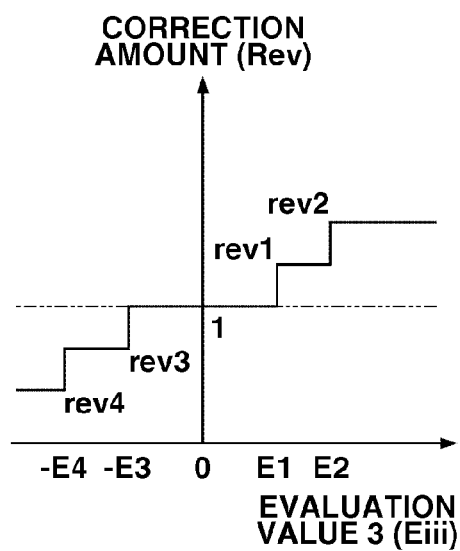
Figure 4D:
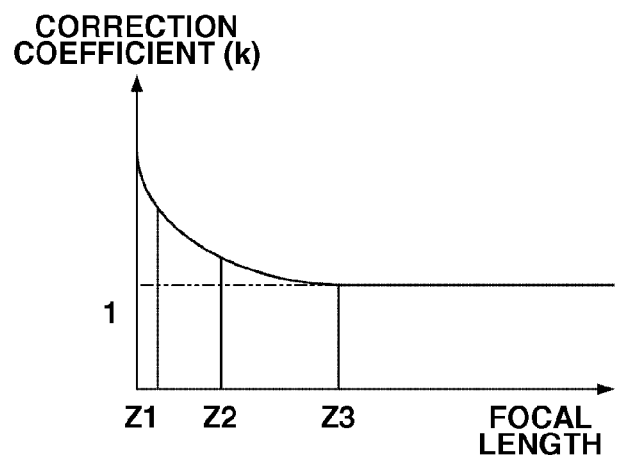

As illustrated in FIG. 4C, if E1≤Eiii<E2 (0<E1<E2), many regions, whose light metering values are less than the target region, exist in the peripheral region. Therefore, it is considered that the light metering value of the target region becomes smaller than the originally assumed light metering value. Hence, the correction amount (Rev) is set to rev1 (rev1>1). If E2≤Eiii, as compared to the case of E1≤Eiii<E2, many regions, whose light metering values are smaller than the target region as the peripheral region. Therefore, it is considered that the light metering value of the target region becomes smaller than the originally assumed light metering value. Hence, the correction amount (Rev) is set to rev2 (rev2>rev1).

On the contrary, if −E4≤Eiii<−E3 (0<E3<E4), many regions, whose light metering values are larger than the target region, exist in the peripheral region. Therefore, it is considered that the light metering value of the target region becomes larger than the originally assumed light metering value. Hence, the correction amount (Rev) is set to rev3 (rev3<1). If Eiii<−E4, as compared to the case of −E4≤Eiii<−E3, many areas, whose light metering values are greater than the target region, exist in the peripheral region. Therefore, it is considered that the light metering value of the target region becomes greater than the originally assumed light metering value. Hence, the correction amount (Rev) is set to rev4 (rev4<rev3).

If −E3≤Eiii<E1, it is considered that a difference in light metering values between the target region and the peripheral region is not large, and the light metering value of the target region is substantially equal to the originally assumed light metering value. Therefore, the correction amount (Rev) is 1, in other words, the correction of the light metering value is not performed.

The correction amount calculated in this manner is stored in the memory 108 by the camera microcomputer 101.

In step S105, the camera microcomputer 101 determines whether the correction amount calculation is completed with respect to the light metering values of the entire light metering regions AEi (i=1, 2, . . . , 9). If there exists the light metering area in which the correction amount calculation is not completed (NO in step S105), the processing returns to step S102 to select a new light metering area as the target region, and performs processing of steps S103 and S104.

If the correction amount calculation is completed with respect to the light metering values of the entire light metering regions (YES in step S105), in step S106, the camera microcomputer 101 reflects the correction amount to the light metering value of each light metering region. Specifically, the corrected light metering value F'AEi is acquired by the following equation (2).

$$F'AEi = FAEi \times Rev(AEi) \ (i=1, 2, \ldots, 9) \quad (2)$$

In step S107, the camera microcomputer 101 performs a light emission amount calculation process to calculate a light emission amount at the time of a main light emission (main light emission amount), based on the light metering value of each light metering region corrected in step S106.

In step S108, the camera microcomputer 101 captures an image by performing control such that the flash device 300 emits light at the light emission amount calculated in step S107.

As described above, if many regions, in which light metering values are smaller than the corresponding light metering region, exist at the periphery of the selected light metering region, it is considered that the light metering value of the corresponding light metering area becomes smaller than the originally assumed light metering value. Therefore, the correction is performed to increase the light metering value of the corresponding light metering region. On the contrary, if many regions, whose light metering values are greater than the corresponding light metering area, exist at the periphery of the selected light metering region, it is considered that the light metering value of the selected light metering region becomes greater than the originally assumed light metering value. Therefore, the correction is performed to decrease the light metering value of the corresponding light metering region.

As described above, by performing the correction process based on the result of comparison between the light metering value of the selected light metering area and the light metering value of the peripheral region at the periphery of the corresponding light metering region, a more appropriate light emission amount for the subject may be calculated even when the ratio of the subject occupying one entire light metering region is small.

A second exemplary embodiment will be described. The second exemplary embodiment is different from the first exemplary embodiment in terms of the light emission amount calculation process when capturing the flash photography. In addition, since a camera system according to the second exemplary embodiment is substantially similar to that according to the first exemplary embodiment, detailed descriptions thereof will not be repeated.

Hereinafter, the light emission amount calculation process in the flash photography according to the second exemplary embodiment will be described with reference to the flowchart of FIG. 5.

Since the processes, which are performed in steps S201 and S202, are substantially identical to the light emission amount calculation processes in the flash photography, which are performed in steps S101 and S102 according to the first exemplary embodiment, descriptions thereof will not be repeated.

In step S203, the camera microcomputer 101 compares the light metering value of each light metering region as the peripheral region with a predetermined value FH and a predetermined value FL (FH>FL). The camera microcomputer 101 determines whether the number of the region, whose light metering values are greater than the predetermined value FL and less than the predetermined value FH, among the respective light metering regions as the peripheral region, is equal to or greater than a predetermined value. If the number of the regions, whose light metering values are less than the predetermined value FL, or the regions, whose light metering values are greater than the predetermined value FH, among the respective light metering regions as the peripheral region, is equal to or greater than N1 illustrated in FIG. 4B (YES in step S203), the processing proceeds to step S204. Otherwise, if less than N1 (NO in step S203), the processing proceeds to step S206. If the number of the regions, whose light metering values are less than the predetermined value FL, or the regions, whose light metering values are greater than the predetermined value FH, among the respective light metering regions as the peripheral area, is equal to or greater than the predetermined value, it is considered that a subject having the substantially same reflectance exists at the substantially same distance in the target region and in the peripheral region. Therefore, it is considered that even if the ratio of the subject occupying the target region is small, the actual light metering value is substantially equal to the originally assumed light metering value. Hence, it is unnecessary to correct the light metering value of the target region, and processing in steps S204 and S205 are omitted.

In step S204, the camera microcomputer 101 calculates a difference in pre-light metering values between the target region and each light metering region as the peripheral region. In the exemplary embodiment, as with the first exemplary embodiment, it is assumed a value obtained by subtracting the light metering value of the peripheral region from the light metering value of the target region is a difference $\Delta L$ and following description will be provided.

In step S205, the camera microcomputer 101 determines a correction amount of the light metering value of the target region, based on the difference $\Delta L$ in the pre-light metering values of the respective light metering regions as the peripheral area, which are calculated in step S204. A method of determining the correction amount will be described with reference to FIGS. 4A to 4D.

In the exemplary embodiment, unlike the first exemplary embodiment, in the case that the difference $\Delta L$ is excessively large and when the difference $\Delta L$ is excessively great or small, the evaluation value 1 (Ei) of the peripheral region is set to 0. Specifically, if $L1 \leq \Delta L < L3$, the evaluation value 1 is set to Ea (Ea>0), and the number of the regions N(Ea), in which the evaluation value 1 is Ea, is increased by +1. If $L3 \leq \Delta L$, the addition of the number of the regions, in which the evaluation value is 0, is not performed. And vice versa, if $-L4 \leq \Delta L < L2$, the evaluation value 1 is set to Eb (Eb<0), and the number of the regions N(Eb), in which the evaluation value 1 is Eb, is increased by +1. If $\Delta L < -L4$, the addition of the number of the regions, in which the evaluation value is 0, is not performed.

If $L3 \leq \Delta L$, it is considered that reflected light of pre-flash is obtained sufficiently in the target region, the ratio of the subject is great in the target region, and the influence of a background in the target region is small. In other words, it is considered that the difference between the actual light metering value and the originally assumed light metering value is small. Therefore, in the exemplary embodiment, the correction amount is set to be close to 0 so that the correction may not be excessively performed. If $\Delta L < -L4$, it is considered that the reflected light of the pre-flash is obtained sufficiently in the target region, the ratio of the subject is great in the target region, and the influence of a background in the target region is small, but a highly reflective object such as a mirror or a glass exists in the peripheral region.

Even in this case, it is considered that the difference between the actual light metering value and the originally assumed light metering value is small. Therefore, in the exemplary embodiment, the correction amount is set to be close to 0 so that the correction may not be excessively performed.

Subsequently, as with the first exemplary embodiment, an evaluation value 2 (Eii) and an evaluation value 3 (Eiii) are calculated, and a correction amount (Rev) for the light metering value of the target region is calculated based on the evaluation value 3 (Eiii).

Since processes of steps S206 to S209 are substantially similar to those of steps S105 to S108 related to the light emission amount calculation in the flash photography according to the first exemplary embodiment, descriptions thereof are not repeated.

As described above, if the number of the light metering areas, in which the difference in the light metering values from the selected light metering region among the respective light metering region as the peripheral area is small, is large, the light metering value of the selected light metering area is not corrected. Therefore, the unnecessary correction to the light metering value of the selected light metering region can be suppressed. Moreover, if the difference between the light metering value of the selected light metering area and the light metering value of the peripheral region is great, the correction amount calculation is performed so that the correction amount is close to 0. Therefore, the excessive correction to the light metering value of the selected light metering region can be suppressed. Hence, the correction process is appropriately performed depending on the photographing conditions, and a more appropriate light emission amount for the subject can be calculated.

A third exemplary embodiment will be described. The third exemplary embodiment is different from the first and second exemplary embodiments in terms of the light emission amount calculation process when capturing the flash photography. In addition, since a camera system according to the exemplary embodiment is similar to that according to the first exemplary embodiment, detailed descriptions thereof will not be repeated.

Figure 6:
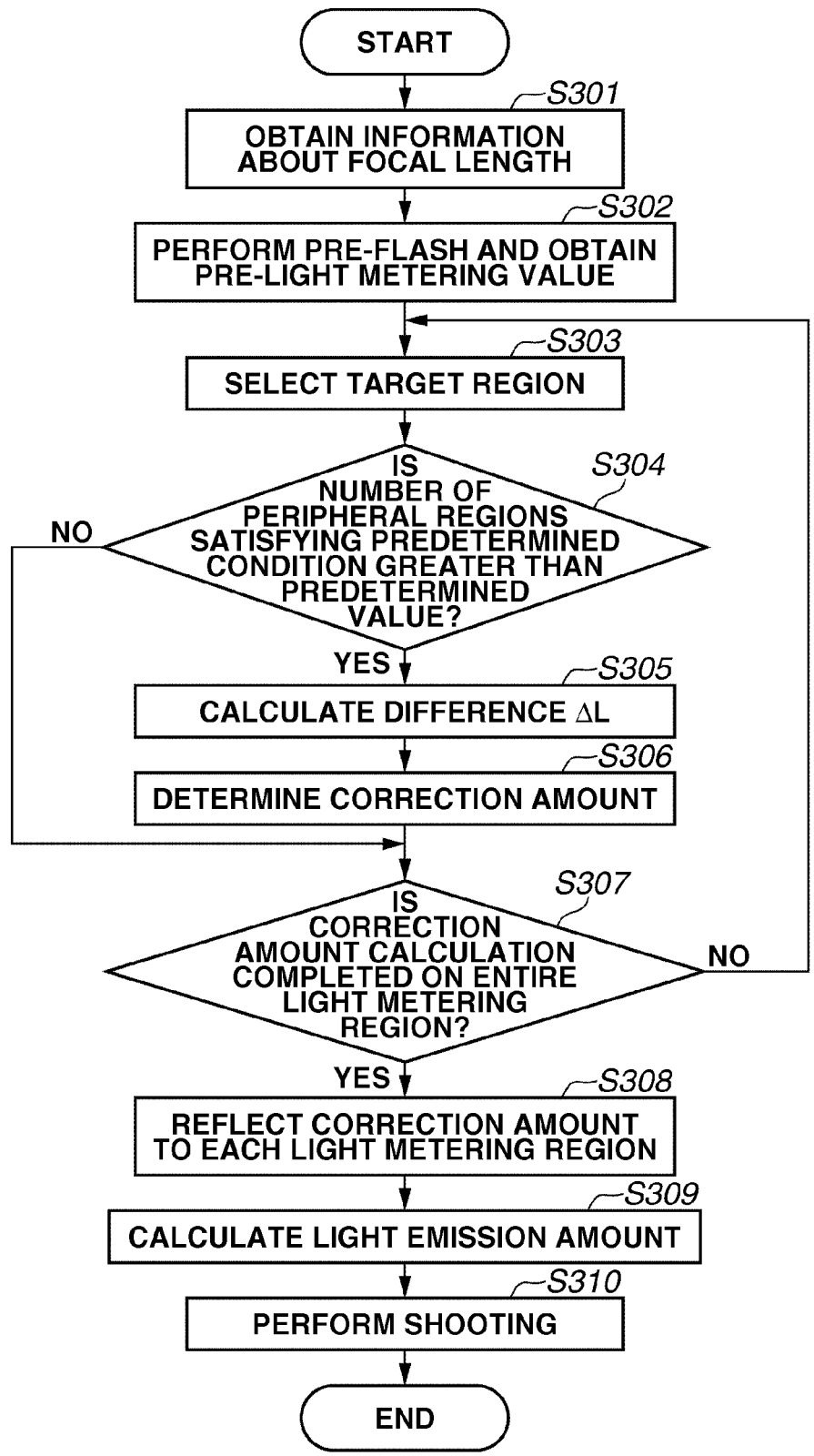
FIG. 6 is a flowchart illustrating a process of calculating a light emission amount in flash photography according to a third exemplary embodiment of the present invention.

Hereinafter, the light emission amount calculation process when capturing the flash photography according to the exemplary embodiment will be described with reference to the flowchart of FIG. 6.

In step S301, a camera microcomputer 101 acquires information about a focal length of a shooting lens from a lens unit 200.

Hereinafter, since processes of steps S302 to S305 are similar to those of steps S201 to S204 related to the light emission amount calculation when capturing the flash photography according to the second exemplary embodiment, descriptions thereof are not repeated.

In step S306, the camera microcomputer 101 determines a correction amount of a light metering value of a target region, based on a difference $\Delta L$ in pre-light metering values of respective light metering regions as a peripheral regions, which are calculated in step S305. A method of determining the correction amount will be described with reference to FIGS. 4A to 4D.

In the exemplary embodiment, unlike the second exemplary embodiment, the information about the focal length of the shooting lens is used to calculate the correction amount.

Specifically, a correction amount (Rev) calculated in the similar manner to the second exemplary embodiment is multiplied by a correction coefficient determined based on the focal length of the shooting lens. The correction coefficient and the focal length of the shooting lens have a relation illustrated in FIG. 4D. As the focal length of the shooting lens becomes shorter, the correction coefficient becomes greater. When shooting with a short focal length of the shooting lens, in other words, when shooting with a wide angle of view, it is considered that ratio of a subject occupying an imaging screen is small. Therefore, as the focal length of the shooting lens becomes shorter, it is determined that a ratio of a subject occupying one light metering region is small, and a difference between an actual light metering value and an originally assumed light metering value is great. Hence, as the focal length of the shooting lens becomes shorter, the correction coefficient is increased. A final correction amount is obtained by being multiplied by the correction coefficient determined based on the information about the focal length of the shooting lens.

Since processes of steps S307 to S310 are similar to those of steps S105 to S108 related to the light emission amount calculation in the flash photography according to the first exemplary embodiment, descriptions thereof are not repeated.

As described above, since the correction amount for the light metering value is calculated by using the information about the focal length of the shooting lens, an appropriate correction amount can be calculated depending on the photographing conditions, and a more appropriate light emission amount for the subject can be calculated.

Although exemplary embodiments of the present invention have been described above, the present invention is not limited to these exemplary embodiments and various variations and modifications can be made within the scope of the present invention.

For example, in the exemplary embodiment, threshold values L1, L2, L3 and L4 are used when the evaluation value 1 (Ei) is calculated. However, the evaluation value 1 (Ei) may be calculated by setting the threshold values more finely. This is equally applied to the case of calculating the evaluation value 2 (Eii) or the evaluation value 3 (Eiii).

In addition, although the difference is obtained by subtracting the light metering value of the peripheral region from the light metering value of the target region, the difference may also be obtained by subtracting the light metering value of the target region from the light metering value of the peripheral region. The comparison of the threshold values may be performed using an absolute value of the difference. For example, the regions, when calculating the evaluation value 1 (Ei), in which an absolute value of a difference in light metering values from the target region is less than a first threshold value among the peripheral regions having light metering values less than the light metering value of the target region may not be included in the number of the regions when calculating the evaluation value 2 (Eii). This corresponds to the comparison between the difference ΔL and L1 in the exemplary embodiment.

In addition, the number of the areas, when calculating the first evaluation value 1 (Ei), in which an absolute value of a difference in light metering values from the target region is equal to or greater than a second threshold value among the peripheral regions having light metering values less than the light metering value of the target region may not be included in the number of the regions when calculating the evaluation value 2 (Eii). In this case, the second threshold value is set to be greater than the first threshold value. This corresponds to the comparison between the difference ΔL and L3 in the exemplary embodiment. In addition, the number of the areas, when calculating the first evaluation value 1 (Ei), in which an absolute value of a difference in light metering values from the target region is equal to or less than a third threshold value among the peripheral regions having light metering values greater than the light metering value of the target region may not be included in the number of the regions when calculating the evaluation value 2 (Eii).

The second threshold value is set to be greater than the first threshold value. This corresponds to the comparison between the difference ΔL and −L2 in the exemplary embodiment. Moreover, the number of the areas, when calculating the evaluation value 1 (Ei), in which an absolute value of a difference in light metering values from the target region is equal to or greater than a fourth threshold value among the peripheral regions having light metering values greater than the light metering value of the target region may not be included in the number of the regions when calculating the evaluation value 2 (Eii). In this case, the fourth threshold value is set to be greater than the third threshold value. The second threshold value is set to be greater than the first threshold value. This corresponds to the comparison between the difference ΔL and −L4 in the exemplary embodiment. Also, in the above example, the demarcation threshold may be set to be less than or equal to the threshold value or set to be less than the threshold value, and the demarcation threshold may be set to be equal to or greater than the threshold value or set to be greater than the threshold value. In the exemplary embodiment, for example, while the evaluation value 1 is Ea (Ea>0) when the difference ΔL is greater than or equal to L1, the evaluation value 1 may also be set to Ea (Ea>0) when the difference ΔL is greater than L1.

Also, the number of the light metering regions of the light metering sensor 106 is not limited to the number described in the above-described exemplary embodiment, and the light metering sensor 106 may have more light metering regions. Moreover, as illustrated in FIGS. 7A and 7B, instead of the light metering region adjacent to the selected light metering region, the light metering region positioned within a predetermined distance range from the selected light metering region may be set as the peripheral region.

Also, instead of performing the correction amount calculation according to the above-described exemplary embodiment, a correction table previously stored in the memory 108 or the like may be used to correct the light metering value based on a frequency distribution of the difference ΔL in pre-light metering values between the selected light metering region and each light metering region as the peripheral region.

Also, instead of the camera system in which the flash device serving as the light emission device is mounted on the camera body as described in the above exemplary embodiment, the light emission device may be embedded into the camera body.

Also, instead of the camera system in which the lens unit is mounted on the camera body as described in the above exemplary embodiment, the lens unit and the camera body may be configured to be integrated with each other.

Also, instead of installing the light metering sensor separately from the image sensor, an imaging screen may be divided into a plurality of areas and a light metering may be performed on each area, based on an image signal output from the image sensor.

Also, the correction amount may be determined by combining the correction amount determining methods described in the three exemplary embodiments set forth above. For example, when the correction amount is determined by the method described in the first exemplary embodiment, the information about the focal length may be used as described in the third exemplary embodiment.

Also, although the three exemplary embodiments have described the case that the main light emission amount is calculated from the time when SW2 is turned on by pressing the shutter button fully to the time when the shooting is started, an operation unit configured to determine the main light emission amount may be provided separately from the shutter button. In this case, for example, when the operation unit configured to determine the main light emission amount is operated, the flowchart illustrated in FIG. 3 is started and the shooting is not performed following the calculation of the main light emission amount.

Also, when the flash photography is performed, the process of correcting the light metering value is not necessarily needed. The correction process may be performed according to the light metering mode and the shooting mode.

Also, all of the plurality of light metering regions need not be set as the target region, and only some of the light metering regions may be set as the target region according to the light metering mode and the shooting mode. Alternatively, only the light metering regions in which a main subject exists may be set as the target region, based on a subject detection result of a subject detection unit (not illustrated).

Also, instead of correcting the light metering value of the target region as the correction of the information about the target region, a weighting coefficient of the target region may be corrected in the light emission amount calculation. For example, in the configuration that calculates the light emission amount by the weighted calculation of the respective light metering values of the plurality of light metering regions, it is only necessary to correct the weighting coefficient of the target region, as with the case of correcting the light metering value of the target region. In this case, it is only necessary to determine the correction amount of the weighting coefficient such that the same effects as the corrections described above in the three exemplary embodiments can be obtained.

OTHER EMBODIMENTS

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-108566 filed May 13, 2011, which is hereby incorporated by reference herein in its entirety.

What is claimed is:

1. A light emission control device for controlling a light emission device, comprising:
    a light metering unit configured to acquire respective light metering values from a plurality of light metering regions; and
    a correction unit configured to correct information about a light metering value of a target region based on a result of comparison between the light metering value of the target region and the light metering value of the light metering region at the periphery of the target region among the plurality of light metering regions, the result being acquired by the light metering unit allowing the light emission device to perform pre-flashing, and
    a calculation unit configured to calculate a main light emission amount of the light emission device based on the information about the light metering value corrected by the correction unit.

2. The light emission control device according to claim 1, wherein the correction unit is configured to correct the light metering value of the target region.

3. The light emission control device according to claim 2, wherein the correction unit is configured to perform a correction to increase the light metering value of the target region, based on the number of regions having light metering values less than the light metering value of the target region in the light metering regions at the periphery of the target region.

4. The light emission control device according to claim 3, wherein the correction unit is configured to perform a correction to increase the light metering value of the target region as the number of regions having light metering values less than the light metering value of the target region in the light metering regions at the periphery of the target region is increased.

5. The light emission control device according to claim 3, wherein the correction unit is configured to perform a correction to increase the light metering value of the target region, based on the number of regions except regions in which an absolute value of a difference in light metering values from the target region is less than a first threshold value, among the regions having light metering values less than the light metering value of the target regions in the light metering regions at the periphery of the target region.

6. The light emission control device according to claim 3, wherein the correction unit is configured to perform a correction to increase the light metering value of the target region, based on the number of regions except regions in which an absolute value of a difference in light metering values from the target region is equal to or greater than a second threshold value, among the regions having light metering values less than the light metering value of the target regions in the light metering regions at the periphery of the target region.

7. The light emission control device according to claim 2, wherein the correction unit is configured to perform a correction to decrease the light metering value of the target region, based on the number of regions having light metering values greater than the light metering value of the target region in the light metering regions at the periphery of the target region.

8. The light emission control device according to claim 7, wherein the correction unit is configured to perform a correction to decrease the light metering value of the target region as the number of regions having light metering values greater than the light metering value of the target region is increased in the light metering regions at the periphery of the target region.

9. The light emission control device according to claim 7, wherein the correction unit is configured to perform a correction to decrease the light metering value of the target region, based on the number of regions except regions in which an absolute value of a difference in light metering values from the target region is less than a third threshold value, among the regions having light metering values greater than the light metering value of the target regions in the light metering regions at the periphery of the target region.

10. The light emission control device according to claim 7, wherein the correction unit is configured to perform a correction to decrease the light metering value of the target region, based on the number of regions except regions in which an absolute value of a difference in light metering values from the target region is equal to or greater than a fourth threshold value, among the regions having light metering values greater than the light metering value of the target regions in the light metering regions at the periphery of the target region.

11. The light emission control device according to claim 2, wherein the correction unit is configured to perform a correction on the light metering value of the target region, based on the number of regions having light metering values less than the light metering value of the target region and the number of regions having light metering values greater than the light metering value of the target region in the light metering regions at the periphery of the target region.

12. The light emission control device according to claim 2, wherein the light emission control device is an imaging device,
- wherein the light emission control device further comprises an acquisition unit configured to acquire information about a focal length of a shooting lens, and
- wherein the correction unit increases a correction amount of the light metering value of the target region as the focal length of the shooting lens becomes shorter.

13. The light emission control device according to claim 1, wherein the calculation unit is configured to calculate a main light emission amount of the light emission device by performing a weighted calculation on light metering values of the plurality of light metering areas, which are acquired by the light metering unit, and
- wherein the correction unit is configured to correct a weighting coefficient on light metering values of the target regions.

14. The light emission control device according to claim 1, wherein the correction unit is configured to perform a correction on information about a plurality of light metering values by changing the regions to be the target region among the plurality of light metering regions, and
- wherein the calculation unit is configured to calculate a main light emission amount of the light emission device, based on the information about the plurality of light metering values corrected by the correction unit.

15. A light emission control method for controlling a light emission device, comprising:
- performing a light metering to acquire a light metering value of each of a plurality of light metering regions; and
- correcting information about a light metering value of a target region, based on a result of comparison between the light metering value of the target region and the light metering value of the light metering area at the periphery of the target region among the plurality of light metering regions, the result being acquired by the operation of light metering allowing the light emission device to perform pre-flashing,
- wherein a main light emission amount of the light emission device is calculated based on the corrected information.

* * * * *